United States Patent [19]

Okumura et al.

[11] Patent Number: 4,792,020
[45] Date of Patent: Dec. 20, 1988

[54] VEHICLE WHEEL ASSEMBLY

[75] Inventors: Shinichiro Okumura; Yasushi Suganuma, both of Wako, Japan

[73] Assignee: Honda Giken Kogyo Kabushiki Kaisha, Tokyo, Japan

[21] Appl. No.: 133,467

[22] Filed: Dec. 15, 1987

[30] Foreign Application Priority Data

Dec. 19, 1986 [JP] Japan ............................ 61-196605

[51] Int. Cl.$^4$ ........................................... F16D 65/12
[52] U.S. Cl. ................................. 188/18 A; 301/6 E
[58] Field of Search ............... 188/18 A, 71.1, 206 R, 188/218 XL; 301/6 E

[56] References Cited

U.S. PATENT DOCUMENTS 3,478,844 11/1969 Beuchle ........................... 188/18 A
3,774,933 11/1973 Asberg ....................... 188/18 A X
4,010,986 3/1977 Otto ............................. 301/6 E X

FOREIGN PATENT DOCUMENTS 2919411 11/1980 Fed. Rep. of Germany ... 188/18 A

Primary Examiner—Duane A. Reger
Attorney, Agent, or Firm—Armstrong, Nikaido, Marmelstein & Kubovcik

[57] ABSTRACT

A brake disc and a wheel having circumferentially spaced mounting seats are secured by threaded studs to a radially extending flange of a hub to form a wheel assembly in which pressure-receiving portions of the wheel assembly are provided opposite the wheel mounting seats and a recess is provided between each pressure-receiving portion and a cylindrical portion of brake disc to permit deflection of pressure-receiving portions as hub nuts are tightened on the threaded studs.

8 Claims, 4 Drawing Sheets

VEHICLE WHEEL ASSEMBLY

BACKGROUND OF THE INVENTION

The present invention relates to a vehicle wheel assembly having a brake disc mounted to a wheel and, more specifically, to an improved assembly wherein a brake disc and wheel are mounted and secured to a hub mounted on a vehicle axle.

In a conventional structure or wheel assembly of this type, a support flange of a brake disc is generally disposed so as to directly contact mounting seats on the wheel.

Such a conventional structure has resulted in certain problems, particularly when the accuracy of the flatness and deflection of the brake disc and brake friction pads are inferior which produces an abnormal sound or otherwise disturbs the driver's concentration during a braking operation.

In order to secure the accuracy necessary to avoid such problems in a prior art structure of this kind, various means have been adopted, which include a means for manufacturing a brake disc in an assembled state. However, unless the accuracy of the flatness and deflection of the brake disc and brake friction pad is improved after the wheel has been mounted, no benefit can be obtained in practice.

Nevertheless, those portions of the wheel mounting seats which project radially outward from the outer edge of a flange portion of the hub exert a pressing force against the brake disc mounting flanges. Accordingly, when the hub bolts are tightened, a load in the bending direction is imparted to those portions of the brake disc mounting flanges which are radially outward of the flange portion of the hub causing deflection and adversely affecting the accuracy of the flatness and desired fit of the previously mentioned parts.

SUMMARY OF THE INVENTION

The present invention has been developed in view of these facts. It is an object of this invention to provide a structure for mounting a brake disc to a wheel, which is adapted to prevent a load in the bending direction from being imparted to the brake disc when the hub bolts are tightened.

According to the prevent invention, pressure-receiving portions which have a diameter substantially equal to the outer diameter of the cylindrical portion, and which contact the mounting seats of the wheel are provided integrally with or separately from the mounting flanges so that the pressure-receiving portions can be bent inward in the axial direction of the hub in accordance with a pressing force from the mounting seats as the hub bolts are tightened.

According to the construction of the present invention, those portions of the mounting seats which extend outward from the outer edge of the hub flange contact the pressure-receiving portion as the hub bolts are tightened and cause the pressure-receiving portions to be bent, thereby preventing a bending load from being imparted to the brake disc.

The construction of the present invention is utilized in a vehicle wheel assembly of the type which includes a brake disc and a wheel secured for rotation with a hub mounted to an axle and comprises a brake disc having a cylindrical portion coaxially surrounding the hub and a mounting flange extending radially inward from one end of the cylindrical portion. The hub has a flange extending radially outward and opposed to said mounting flange. The wheel has a plurality of circumferentially spaced mounting seats contacting the mounting flange over substantially the entire radial region thereof and an aperture through each of the mounting seats and axially aligned with corresponding apertures in the brake disc mounting flange and the hub flange. Means such as threaded studs extend through each of the axially aligned apertures and are adapted for example with hub nuts to tighten the wheel assembly by drawing each of the mounting seats against one of a plurality of pressure-receiving portions of the wheel. The pressure-receiving portions of the wheel assembly are located on a diameter substantially equal to the outer diameter of the cylindrical portion of the brake disc. A recess is provided between the outer periphery of each of the pressure receiving portions of the assembly and the cylindrical portion of the brake disc to permit the pressure receiving portions to bend inward in the axial direction of the hub in response to a load applied by the mounting seats as the wheel assembly is tightened without imparting that load to portions of the brake disc beyond the recess.

The invention and the advantages provided thereby will be more fully understood with reference to the following detailed description of certain embodiments taken in conjunction with the accompanying drawings.

DESCRIPTION OF THE PREFERRED EMBODIMENTS

Figure 1:
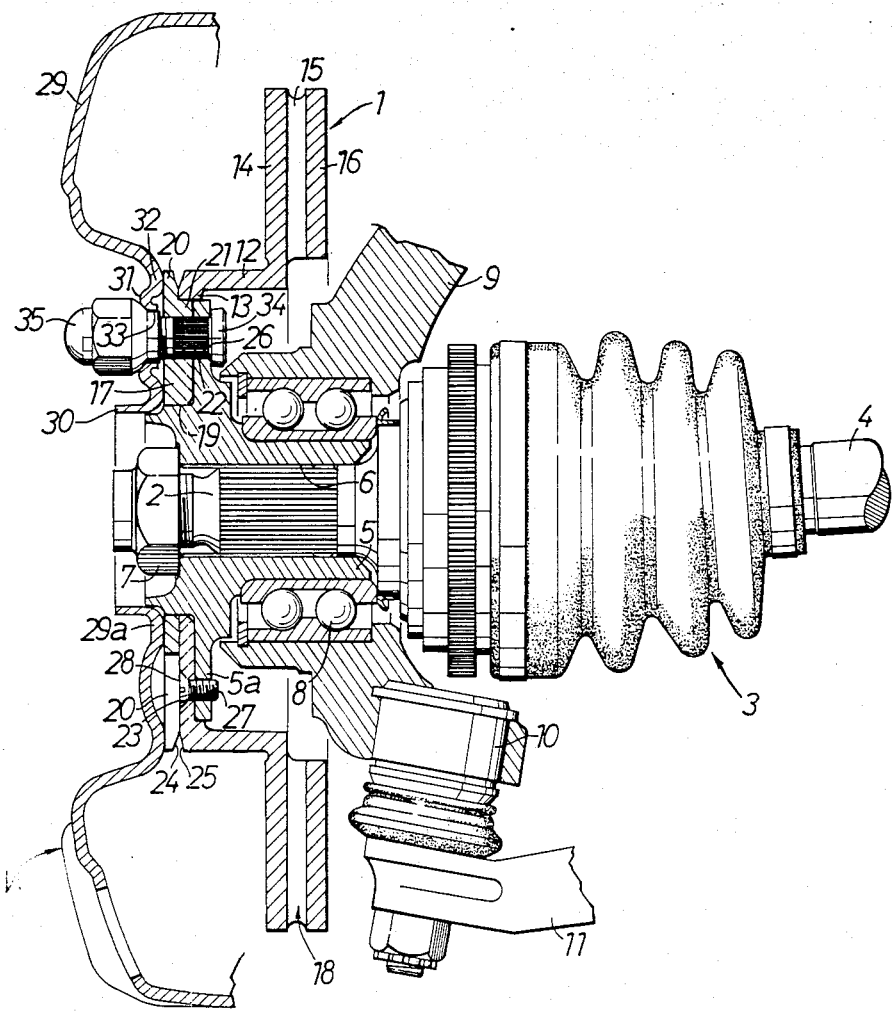
FIG. 1 is a side elevation, partly in section, showing an embodiment of the present invention.

Certain embodiments of the present invention will now be described with reference to the accompanying drawings wherein like reference numerals refer to the same or like parts throughout.

With reference to FIG. 1, which shows a first embodiment of this invention, there is shown a brake disc 1 set in accordance with this invention on a front wheel W of, for example, a vehicle.

A driving shaft 4 is connected to an axle 2 of the front wheel W via a universal joint 3, and a hub 5 is fixedly mounted on the axle 2. The hub 5 is formed basically into a cylindrical shape, and the axle 2 is fitted in the hub 5 via a spline 6, a nut 7 being engaged with the end portion of the axle 2 which projects from the hub 5.

The hub 5 is supported rotatably on a knuckle 9 via a bearing 8, and a lower arm 11 is joined to the lower portion of the knuckle 9 via a ball joint 10.

Figure 2:
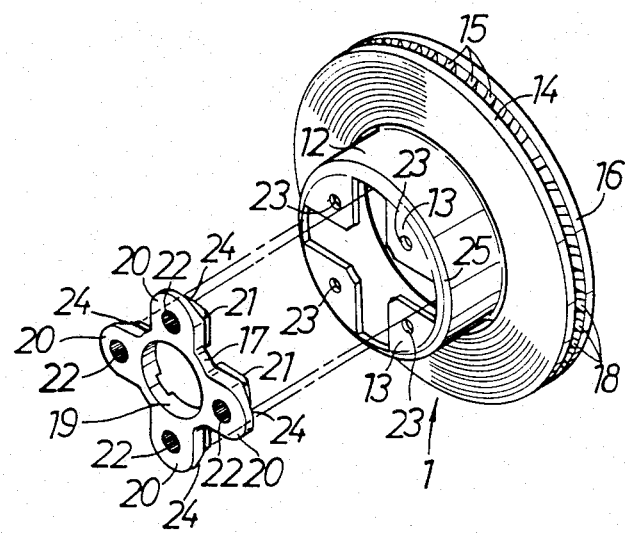
FIG. 2 is an exploded perspective view of the brake disc of FIG. 1.

Referring to FIG. 2 in combination with FIG. 1, the brake disc 1 has a cylindrical portion 12 surrounding the hub 5 concentrically therewith, mounting flanges 13 projecting radially in the inward direction from one end of the cylindrical portion 12, a slide plate 14 extending radially in the outward direction from the other end of the cylindrical portion 12, and another slide plate 16 fixed to the slide plate 14 via a plurality of ribs 15. The brake disc 1 is cast integrally with these elements. A substantially cross-shaped pressure-receiving member 17 is cast as a core or unit between the mounting flanges 13. The ribs 15 are arranged to extend radially and form a plurality of radially-extending air flow passages between the two slide plates 14 and 16.

Pads (not shown) are provided to be pressed in sliding contact with the outer surfaces of the slide plates 14, 16. When these pads are pressed against the outer surfaces of the slide plates 14, 16, a frictional force is generated, by which a braking force is applied to the front wheel W.

The pressure-receiving member 17 has at the central portion thereof an aperture or hole 19 through which the hub 5 is inserted, and it further has four radially outward directed arms providing pressure-receiving portions 20 formed in the shape of a cross. The pressure-receiving member 17 is cast unitarily in the brake disc 1 so that the anchor portions 21 projecting from the pressure-receiving portions 20 are received and buried between adjacent mounting flanges 13. The radially outer ends of the pressure-receiving portions 20 are positioned on an imaginary circle the diameter of which is equal to the outer diameter of the cylindrical portion 12 of the brake disc 1. The pressure-receiving portions 20 and their corresponding anchor portions 21 are provided with through holes 22. The portions of the mounting flanges 13 which are between the pressure-receiving portions 20 are provided with small-diameter mounting holes 23.

The edge surfaces 24 of the outer end sections of the pressure-receiving portions 20 which face the mounting flanges 13 are inclined away from the mounting flanges 13 in a radially outward direction. The outer edge portions of the mounting flanges 13 are provided with a chamfered portion 25 which extends over the whole circumference of the cylindrical portion 12 and the portion 25 inclines radially outward in a direction away from the pressure-receiving member 17. The inclined edge surfaces 24 of the pressure-receiving portions 20 and the chamfered portion 25 of the cylindrical portion 12 define a recess between the pressure-receiving portions 20 and the cylindrical portion 12 of the brake disc 1 which permits the outer end sections of the pressure-receiving portions 20 to be bent in the axially inward direction (rightward in FIG. 1) until the inclined surfaces 24 have contacted the chamfered portion 25.

The hub 5 is provided with a flange portion 5a opposed to the mounting flanges 13 of the brake disc 1 and formed integrally with the hub 5 so as to project in a radially outward direction. This flange portion 5a is provided with four through holes 26 corresponding to the through holes 22, as well as four threaded holes 27 which are formed between the through holes 26 and are axially aligned to correspond to mounting holes 23 cast in the mounting flanges 13.

The hub 5 and brake disc 1 are combined unitarily by engaging screw members 28 inserted through the mounting holes 23 with the threaded holes 27, and tightening the same, and, when the hub 5 and brake disc 1 have thus been combined unitarily, the through holes 22, 26 are coaxially aligned together.

A disc portion 29a of a wheel body 29 of the front wheel W is provided with a cylindrical part 30 formed integrally therewith, and the nut 7 is positioned in the central section of the cylindrical part 30. Four mounting seats 31 which are spaced at equal intervals in the circumferential direction of the cylindrical part 30 are provided around the cylindrical part 30 so as to extend over the substantially whole radial regions of the mounting flanges 13.

Each of the mounting seats 31 is formed so as to be recessed at the outer side (leftward in FIG. 1, in the direction along the axis of the hub) and has an annular pressing portion 32 as the outer circumferential edge thereof, which pressing portion 32 has an axis parallel to that of the hub 5. A part of the pressing portion 32 contacts the outer end section of the corresponding pressure-receiving portion 20 of the pressure-receiving member 17 in a position which is on the radially outer side of the outer edge of the hub flange portion 5a, when the wheel 29 has been combined unitarily with the hub 5 and brake disc 1. Each mounting seat 31 is provided with through holes 33 in the central portion thereof.

Hub bolts 34 the outer surfaces of which are serrated are press-fitted from the axially inner side of the hub 5 into the through holes 26, 22 in the flange portion 5a and pressure-receiving member 17 which are combined unitarily with the screw members 28. The portions of the hub bolts 34 which project outward from the pressure-receiving member 17 are inserted into the through holes 33 in the mounting seats 31 in the wheel body 29. Hub nuts 35 are engaged with those portions of the hub bolts 34 which project outward from the mounting seats 31. The hub nuts 35 are tightened until they have contacted the mounting seats 31, so that the hub 5, brake disc 1 and wheel body 29 are combined unitarily.

The operation of this embodiment will now be described. When the hub nuts 35 are tightened so as to combine the hub 5, brake disc 1 and wheel body 29 unitarily, a part of each pressing portion 32 projects outward from the outer edge of the hub flange portion 5a, so that the outer end sections of the pressure-receiving portions 20 of the pressure-receiving member 17 are pressed by the pressing portions 32 and thereby bent in an axially inward direction. Since the pressure-receiving portions 20 are thus bent, a pressing force is not applied directly from those parts of the pressing portions 32 which extend outward from the radially outer edge of the hub flange portion 5a to the outer edges of the mounting flanges 13, so that the surface pressures on the mounting flanges 13 and flange portion 5a become equal. Accordingly, a bending load is not imparted to the brake disc 1, and the accuracy of the flatness and deflection of the slide plates 14, 16 is thereby improved by properly mounting the slide plates 14, 16 to the front wheel W, thus making it possible to eliminate the causes of the abnormal sounds and driver disturbances previously referred to.

Figure 3:
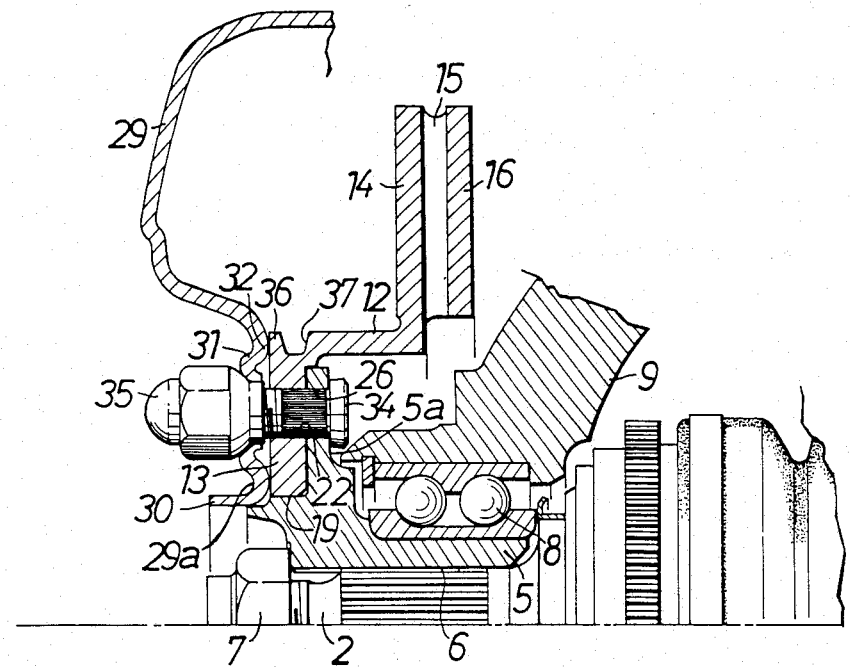
FIGS. 3 and 4 are side elevations, partly in section, showing principal portions of other embodiments of the invention.

FIG. 3 shows a second embodiment of the invention in which the parts corresponding to those of the previously described embodiment are designated by the same reference numerals.

In the second embodiment, the pressure-receiving member 17 in the previously-described embodiment is omitted, and the mounting flanges 13 of the brake disc 1 are provided in their outer side surfaces with a V-shaped groove or recess 37 extending over the whole circumferences thereof, so as to allow the portions of the mounting flanges 13, which contact the pressing portions 32 at positions radially outward from the outer edge of the hub flange portion 5a, to be axially bent as pressure-receiving portions 36.

The second embodiment also produces the same beneficial effect as the previously-described embodiment.

Figure 4:
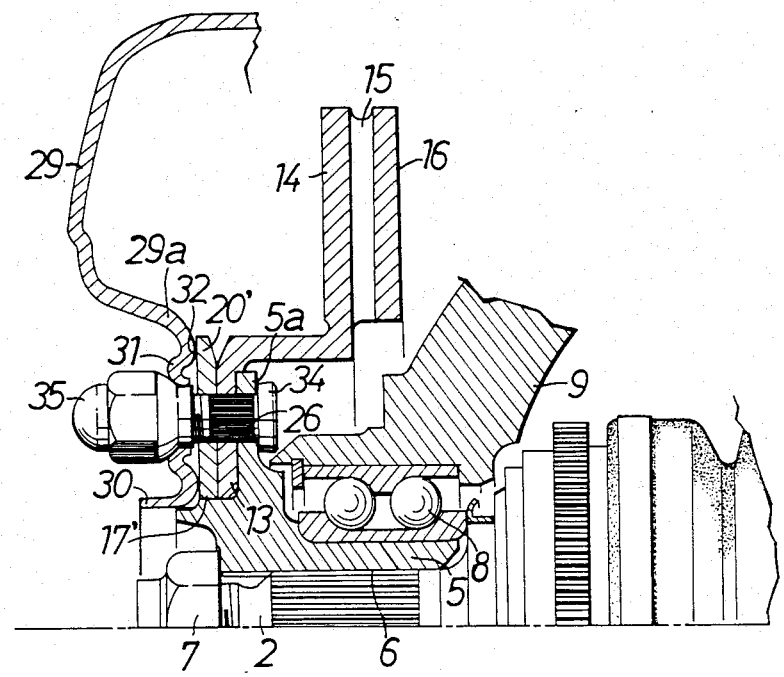

FIG. 4 which illustrate still another embodiment of the invention shows a separate pressure-receiving member 17', having tongue-shaped pressure-receiving portions 20' opposed to the mounting seats 31. The annular shaped, pressure-receiving member 17' is located in the assembly between the mounting flanges 13 and disc portion 29a of the wheel so that the pressure-receiving portions 20' can be bent in response to a pressing force from the pressing portions 32.

Thus, according to the present invention as described above, the pressure-receiving portions, which contact the wheel mounting seats, the diameter of which is substantially equal to the outer diameter of the cylindrical portion of the brake disc are provided integrally with or separately from the mounting flanges so that the pressure-receiving portions can be bent or deflected in the axially inward direction of the hub in response to the pressing force from the mounting seats. Therefore, when the hub bolts are tightened, the pressure-receiving portions are bent under the load and the bending load is not imparted to the brake disc. This enables the desired accuracy of the flatness and deflection of the brake disc in the wheel assembly to be retained since the cylindrical portion and the slide plates are not influenced by the bending load.

What is claimed is:

1. A vehicle wheel assembly of the type which includes a brake disc and a wheel secured for rotation with a hub mounted to an axle, comprising:

a brake disc having a cylindrical portion concentrically surrounding said hub and a mounting flange extending radially inward from one end of said cylindrical portion, said hub having a flange extending radially outward and opposed to said mounting flange, a wheel having a plurality of circumferentially spaced mounting seats contacting said mounting flange over substantially the entire radial region thereof, an aperture through each of said mounting seats and axially aligned with corresponding apertures in said brake disc mounting flange and said hub flange, means extending through each of said axially aligned apertures and adapted to tighten said wheel assembly by pressing each of said mounting seats against one of a plurality of pressure-receiving portions of said wheel assembly, said pressure-receiving portions of said wheel assembly being located on a diameter substantially equal to the outer diameter of said cylindrical portion of said brake disc, and a recess being provided between the outer periphery of each of said pressure receiving portions of said assembly and the cylindrical portion of said brake disc for allowing bending of said pressure receiving portions inward in the axial direction of said hub.

2. The vehicle wheel assembly defined by claim 1 wherein said mounting seats of said wheel are pressed against pressure receiving portions of said mounting flange and said recess is a V-shaped groove extending circumferentially around said mounting flange between a radially outer periphery of said mounting flange and the cylindrical portion of said brake disc.

3. The vehicle wheel assembly defined by claim 1 wherein said assembly includes an annular, pressure-receiving member having tongue shaped pressure-receiving portions and said annular, pressure receiving member is located between said mounting flange and said wheel with said tongue shaped pressure-receiving portions opposed to said mounting seats and defining said recess between said pressure receiving member and said mounting flange.

4. The vehicle wheel assembly defined by claim 3 wherein a radially outer edge of said mounting flange is chamfered opposite to said tongue shaped pressure-receiving portions.

5. The vehicle wheel assembly defined by claim 1 wherein said mounting flange is a composite of a plurality of radially inwardly directed flanges formed integrally with said cylindrical portion of said brake disc and cast around a pressure receiving core comprised of a center having a hub receiving aperture and a plurality of radially outwardly directed arms with each arm providing said pressure-receiving portion having an inclined outer edge and an axially projecting anchor portion received between adjacent ones of said radially inwardly directed flanges, said inclined outer edges providing said recess between the outer periphery of each said pressure receiving portion of said assembly and the cylindrical portion of said brake disc.

6. The vehicle wheel assembly defined by claim 5 wherein an end of said cylindrical portion of said brake disc opposite said inclined outer edges of said pressure-receiving portions is chamfered.

7. The vehicle wheel assembly defined by claim 5 wherein said composite mounting flange is comprised of four radially inward directed flanges cast around four radially outwardly directed arms of said pressure receiving core.

8. The vehicle wheel assembly defined by claim 5 further including an aperture through each of said radially inward directed flanges and axially aligned with apertures in said hub flange for attaching said mounting flange to said hub flange.

* * * * *